US008275255B2

(12) United States Patent
Iwasaki et al.

(10) Patent No.: US 8,275,255 B2
(45) Date of Patent: Sep. 25, 2012

(54) LENS BARREL AND IMAGING DEVICE

(75) Inventors: Shinichi Iwasaki, Osaka (JP); Tetsuya Uno, Osaka (JP)

(73) Assignee: Panasonic Corporation, Osaka (JP)

( * ) Notice: Subject to any disclaimer, the term of this patent is extended or adjusted under 35 U.S.C. 154(b) by 29 days.

(21) Appl. No.: 12/837,512

(22) Filed: Jul. 16, 2010

(65) Prior Publication Data

US 2011/0019988 A1   Jan. 27, 2011

(30) Foreign Application Priority Data

Jul. 24, 2009  (JP) .................................. 2009-172703

(51) Int. Cl.
G03B 17/02 (2006.01)
G03B 17/14 (2006.01)
(52) U.S. Cl. ........................................ 396/542; 396/349
(58) Field of Classification Search .................... 396/72, 396/349, 542
See application file for complete search history.

(56) References Cited

U.S. PATENT DOCUMENTS

| | | | | |
|---|---|---|---|---|
| 4,596,454 A * | 6/1986 | Kawai et al. | .................. | 396/532 |
| 4,951,083 A * | 8/1990 | Okura et al. | .................. | 396/542 |
| 5,371,569 A * | 12/1994 | Tanaka | .......................... | 396/542 |
| 5,655,171 A | 8/1997 | Machida et al. | | |
| 5,717,969 A * | 2/1998 | Miyamoto et al. | ............. | 396/535 |
| 5,826,126 A * | 10/1998 | Nomura et al. | ................ | 396/542 |
| 6,052,535 A * | 4/2000 | Uno | ................ | 396/72 |
| 6,493,511 B2 * | 12/2002 | Sato | ................ | 396/72 |
| 6,714,360 B2 * | 3/2004 | Kawanabe | .................... | 359/704 |
| 7,131,773 B2 * | 11/2006 | Sakamoto | .................... | 396/462 |
| 7,623,782 B2 * | 11/2009 | Yu | ................ | 396/542 |
| 2002/0025148 A1 | 2/2002 | Sato | | |
| 2005/0254815 A1 | 11/2005 | Sakamoto | | |
| 2007/0189766 A1 * | 8/2007 | Kuwahara et al. | ............ | 396/542 |
| 2008/0180812 A1 | 7/2008 | Honsho et al. | | |

FOREIGN PATENT DOCUMENTS

| | | |
|---|---|---|
| JP | H05-134159 A | 5/1993 |
| JP | H07-063969 A | 3/1995 |
| JP | H07-218799 | 8/1995 |
| JP | H07-049471 Y2 | 11/1995 |
| JP | H08-254646 A | 10/1996 |
| JP | H11-133288 A | 5/1999 |
| JP | 2001-021789 A | 1/2001 |
| JP | 2002-072040 A | 3/2002 |
| JP | 2002-357757 A | 12/2002 |

(Continued)

OTHER PUBLICATIONS

Iwasaki, et al., "Lens Barrel and Imaging Device," filed Jul. 15, 2010, U.S. Appl. No. 12/836,589.

(Continued)

*Primary Examiner* — Clayton E Laballe
*Assistant Examiner* — Leon W Rhodes, Jr.
(74) *Attorney, Agent, or Firm* — Shinjyu Global IP

(57) ABSTRACT

The lens barrel includes a flexible wire, a first supporting frame and a second supporting frame. The flexible wire has a first end with at least one terminal, a second end with at least one terminal and a bent portion disposed between the first and second ends. The bent portion includes a plurality of part overlapping each other. The first supporting frame supports the first end. The second supporting frame is movably disposed in a first direction with respect to the first supporting frame and supports the bent portion.

19 Claims, 15 Drawing Sheets

FOREIGN PATENT DOCUMENTS

| | | |
|---|---|---|
| JP | 2003-075708 A | 3/2003 |
| JP | 2005-055664 A | 3/2005 |
| JP | 2007-165412 A | 6/2007 |
| JP | 2008-185786 A | 8/2008 |

OTHER PUBLICATIONS

Office Action (mailed May 25, 2012) issued in co-pending U.S. Appl. No. 12/836,589.

* cited by examiner

LENS BARREL AND IMAGING DEVICE

CROSS-REFERENCE TO RELATED APPLICATIONS

This application claims priority under 35 U.S.C. §119 to Japanese Patent Application No. 2009-172703 filed on Jul. 24, 2009. The entire disclosure of Japanese Patent Application No. 2009-172703 is hereby incorporated herein by reference.

BACKGROUND

1. Technical Field

The technology disclosed herein relates to an imaging device and a lens barrel used with the imaging device.

2. Background Information

Imaging devices that make use of a CCD (charge coupled device), a CMOS (complementary metal-oxide semiconductor) sensor, or another such imaging sensor have become extremely popular in recent years. Examples of such imaging devices include digital still cameras and digital video cameras. These imaging devices are generally equipped with a lens barrel for forming an optical image of a subject on an imaging element. A telescoping lens barrel, with which the lens barrel is stowed in the camera body when not being used for imaging, has been used as this type of lens barrel.

SUMMARY

One aspect of the technology disclosed herein is a lens barrel that includes a flexible wire, a first supporting frame and a second supporting frame. The flexible wire has a first end with at least one terminal, a second end with at least one terminal and a bent portion disposed between the first and second ends. The bent portion includes a plurality of part overlapping each other. The first supporting frame supports the first end. The second supporting frame is movably disposed in a first direction with respect to the first supporting frame and supports the bent portion.

BRIEF DESCRIPTION OF DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Configuration of Digital Camera

Figure 1:
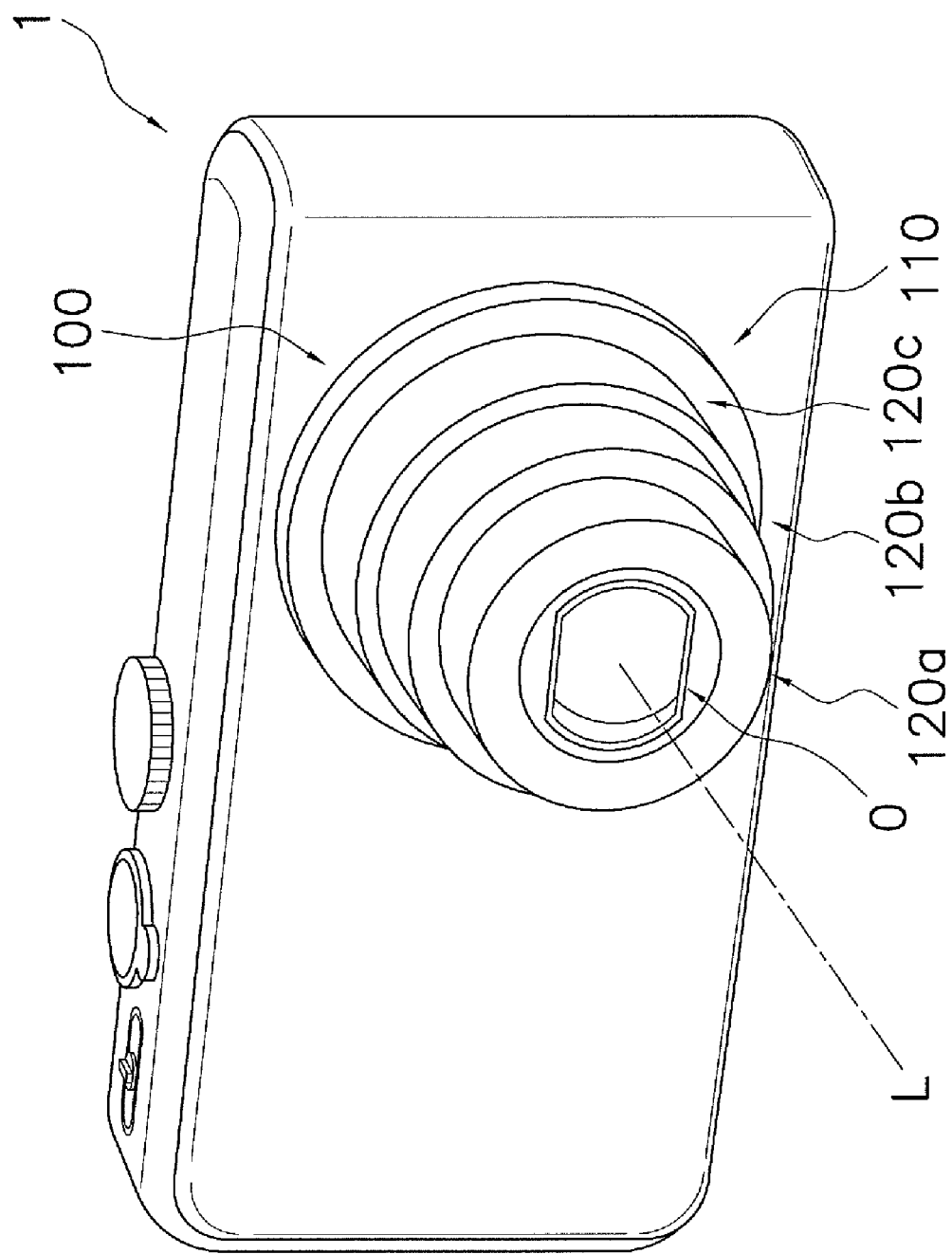
FIG. 1 is an oblique view of a digital camera.

As shown in FIG. 1, a lens barrel 100 (an example of a lens barrel) is mounted on a digital camera 1 (an example of an imaging device). Examples of imaging devices include digital still camera and digital video cameras that make use of an imaging element. Examples of imaging elements include CCD image sensors and CMOS image sensors.

Overall Configuration of Lens Barrel

Figure 2:
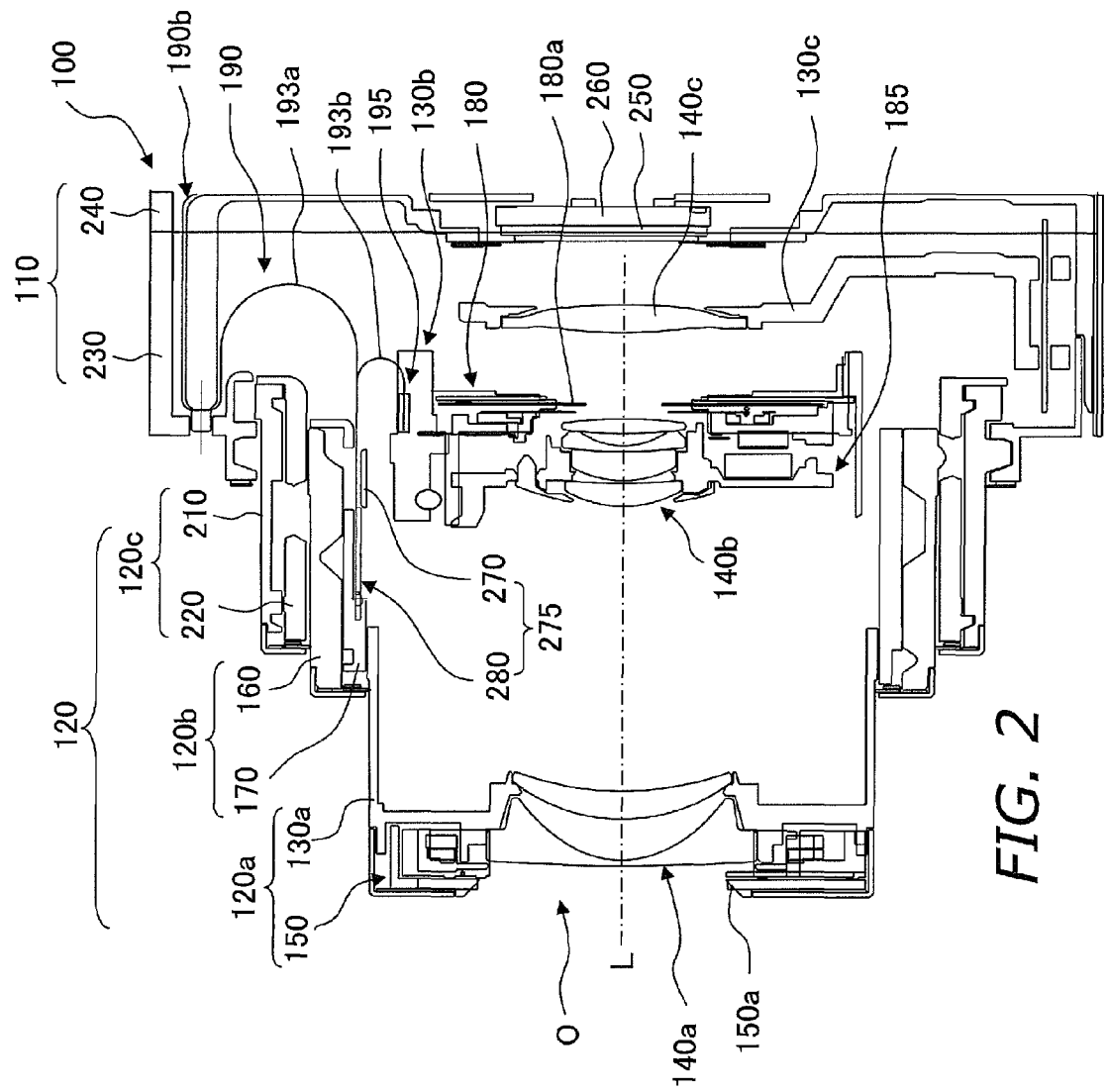
FIG. 2 is a cross section of a lens barrel (wide angle end)
Figure 3:
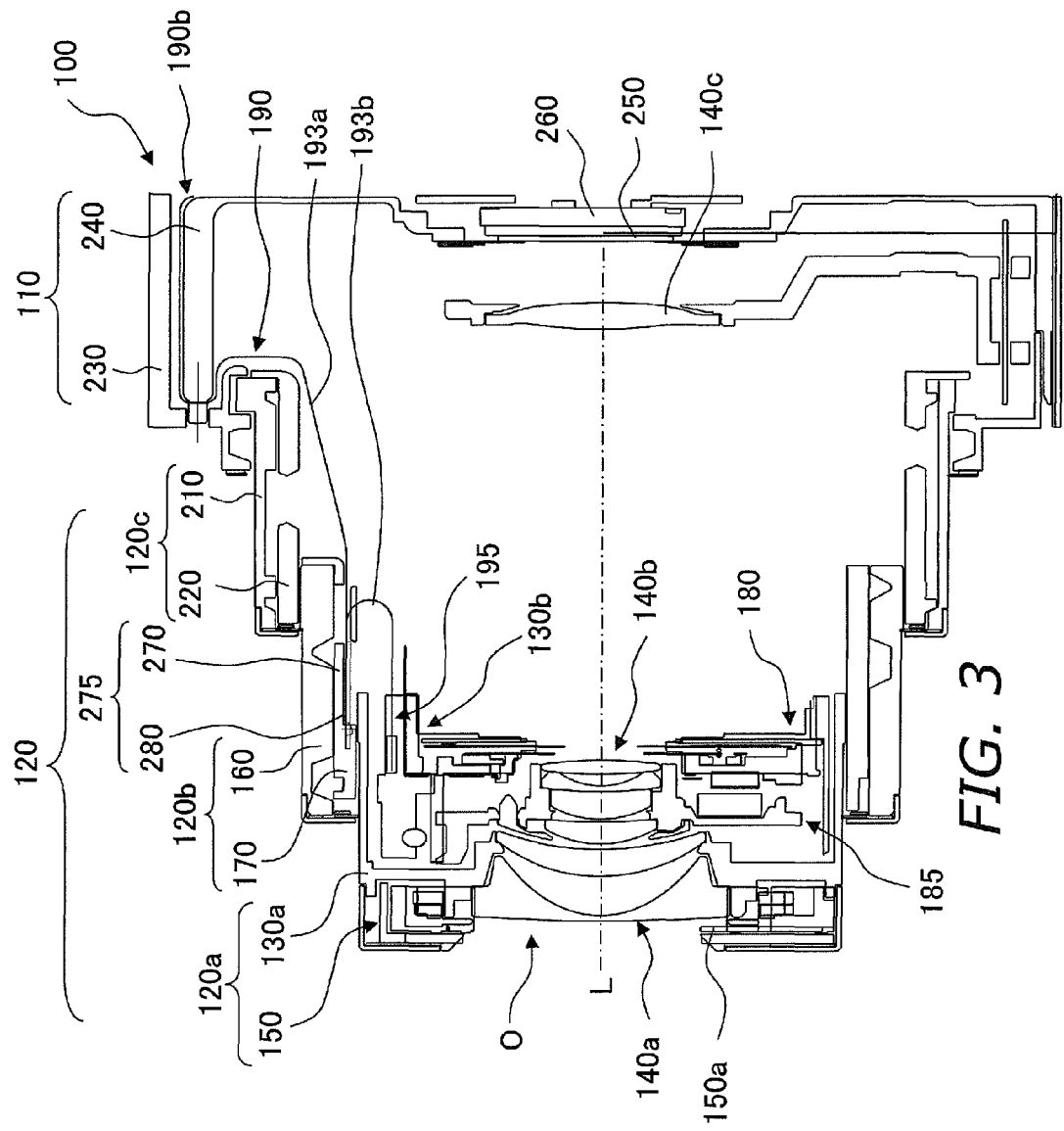
FIG. 3 is a cross section of a lens barrel (telephoto end)
Figure 4:
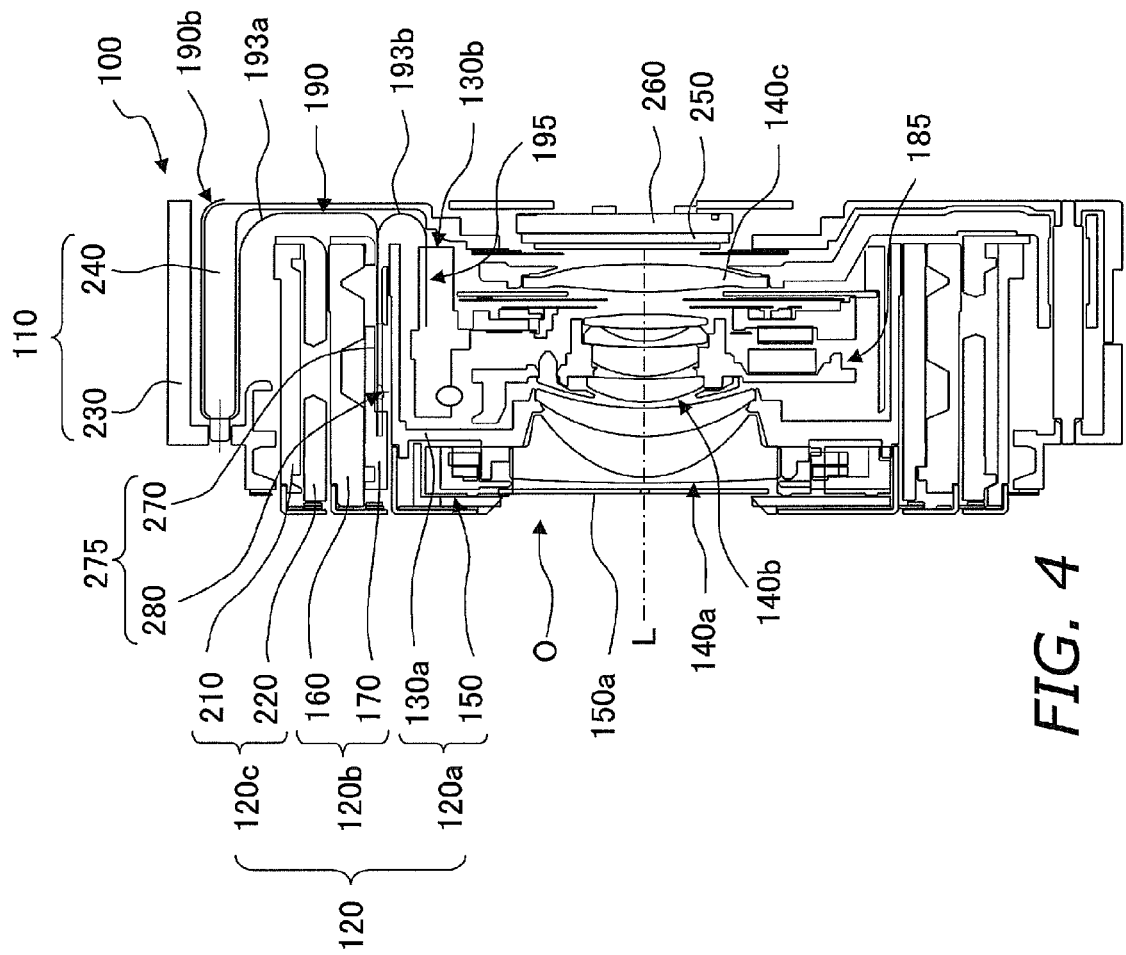
FIG. 4 is a cross section of a lens barrel (when retracted)
Figure 5:
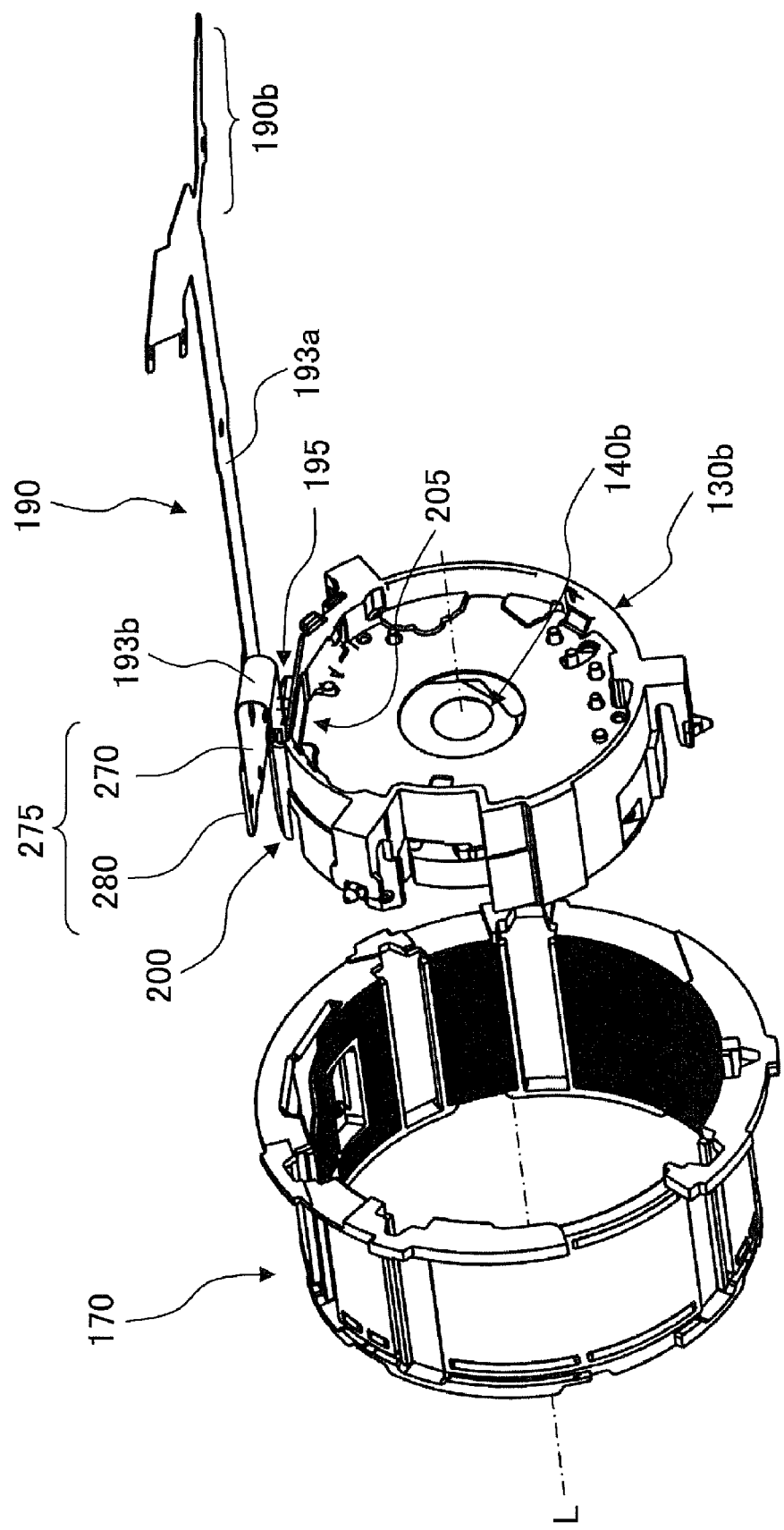
FIG. 5 is an exploded oblique view of a rectilinear frame and a second lens frame.

The overall configuration of the lens barrel 100 will be described. As shown in FIGS. 2 to 4, the lens barrel 100 comprises an optical system O, a fixed lens barrel 110 (an example of a first supporting frame), a moving lens barrel 120 disposed inside the fixed lens barrel 110, and a CCD unit 260 (an example of an imaging element).

The optical system O has a first lens group 140a, a second lens group 140b, and a third lens group 140c. The optical system O also an optical axis L defined by these lens groups. A direction parallel to the optical axis L will hereinafter also be called the optical axis direction. The optical axis direction is an example of a first direction in which the second supporting frame moves with respect to the first supporting frame.

The first to third lens groups 140a to 140c each is made up of a plurality of lenses. However, the first to third lens groups 140a to 140c may instead each is made up of a single lens. The first lens group 140a is a lens group for taking in an optical image of a subject. The second lens group 140b is used for zoom adjustment. The third lens group 140c is used for focus adjustment. The zoom and focus are adjusted by changing the spacing between the first to third lens groups 140a to 140c.

The moving lens barrel 120 is deployed forward (toward the subject) with respect to the fixed lens barrel 110, and stowed inside the fixed lens barrel 110. More specifically, the moving lens barrel 120 has a first moving lens barrel 120a, a second moving lens barrel 120b, a third moving lens barrel 120c, and a second lens frame 130b (an example of a second supporting frame).

The second moving lens barrel 120b is disposed inside the third moving lens barrel 120c, and the first moving lens barrel 120a is disposed inside the second moving lens barrel 120b. During imaging, the second moving lens barrel 120b is deployed with respect to the third moving lens barrel 120c, and the first moving lens barrel 120a is deployed with respect to the second moving lens barrel 120b. During retraction, the second moving lens barrel 120b is stowed in the third moving lens barrel 120c, and the first moving lens barrel 120a is stowed in the second moving lens barrel 120b. Thus, the first to third moving lens barrels 120a to 120c are deployed forward with respect to the fixed lens barrel 110, or are stowed in the fixed lens barrel 110. When the first to third moving lens barrels 120a to 120c have been deployed forward, the first moving lens barrel 120a is deployed at the very front.

Detailed Configuration of Lens Barrel

The lens barrel 100 will now be described in detail.

As shown in FIGS. 2 to 4, the fixed lens barrel 110 has a cylindrical fixing frame 230 and a master flange 240 that is fixed to this fixing frame 230. The third moving lens barrel 120c is disposed inside the fixing frame 230 to be movable in the optical axis direction. A third lens frame 130c is supported by the fixing frame 230 to be movable in the optical axis direction. The CCD unit 260 (an example of an imaging element) and an IR-filtering glass 250 for blocking out infrared rays are disposed at a central part of the master flange 240.

As shown in FIGS. 2 to 4, the first moving lens barrel 120a has a first lens frame 130a and a barrier unit 150 for protecting the first lens group 140a. The first lens group 140a is fixed to the first lens frame 130a. The barrier unit 150 is disposed on the front (on the subject side) of the first lens frame 130a. The barrier unit 150 has a plurality of barrier blades 150a. During imaging, the barrier blades 150a open and allow light to be incident on the first lens group 140a (see FIGS. 2 and 3, for example). At other times (that is, when the lens barrel is retracted), the barrier blades 150a close, and the first lens group 140a is protected by the barrier blades 150a (see FIG. 4, for example).

As shown in FIGS. 2 to 4, the second moving lens barrel 120b has a cylindrical camera cam frame 160 and a cylindrical rectilinear frame 170 disposed inside the camera cam frame 160. The first moving lens barrel 120a is disposed inside the rectilinear frame 170 movably in the optical axis direction. The first moving lens barrel 120a and the second lens frame 130b are supported by the second moving lens barrel 120b movably in the optical axis direction. More specifically, a cam groove is formed in the inner peripheral face of the camera cam frame 160. This cam groove guides the first lens frame 130a and the second lens frame 130b in the optical axis direction. As a result, the first lens group 140a and the second lens group 140b move in the optical axis direction according to the shape of the cam groove. A rectilinear groove is formed in the rectilinear frame 170. This rectilinear frame 170 causes the first lens group 140a and the second lens group 140b to move in the optical axis direction without rotating with respect to the fixed lens barrel 110.

As shown in FIGS. 2 to 4, the third moving lens barrel 120c has a cylindrical drive frame 210 and a cam through-frame 220 disposed inside the drive frame 210. The second moving lens barrel 120b is disposed inside the cam through-frame 220 movably in the optical axis direction.

As shown in FIGS. 2 to 4, a shutter unit 180, a shake correcting mechanism 185, and a stop mechanism (not shown) are attached, for example, to the second lens frame 130b. The shutter unit 180 has a shutter 180a disposed to the rear of the second lens group 140b. The shake correcting mechanism 185 supports the second lens group 140b movably within a plane perpendicular to the optical axis L. It could also be said that the second lens group 140b is supported by the second lens frame 130b. The stop mechanism adjusts the aperture of the optical system O. Control signals from a controller (not shown) are transmitted via flexible wire 190 to the shutter unit 180, the shake correcting mechanism 185, and the stop mechanism.

Detailed Configuration of Flexible Wiring

Figure 6:
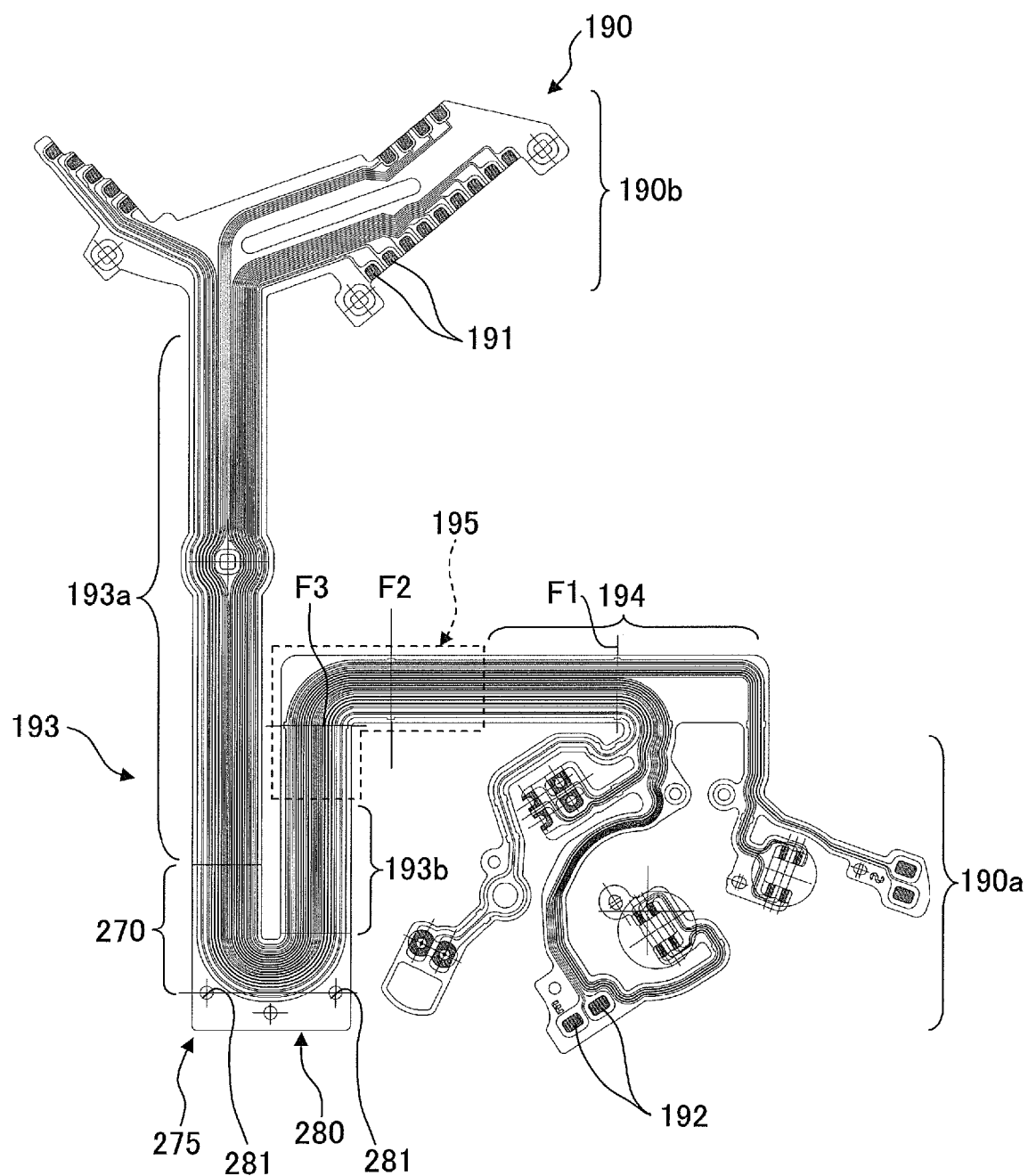
FIG. 6 is a developed view of flexible wire.

The flexible wire 190 will now be described in detail. As shown in FIGS. 2 to 4, the flexible wire 190 is a film-like member on which an plurality of wires are printed and is disposed inside the moving lens barrel 120 and the fixed lens barrel 110. As shown in FIG. 6, the flexible wire 190 has a first end 190b (an example of a first end), a second end 190a (an example of a second end), a first intermediate portion 193 (an example of a first intermediate portion), a second intermediate portion 194 (an example of a second intermediate portion), and a bent portion 195 (an example of a bent portion).

The first end 190b includes a plurality of terminals 191. The terminals 191 of the first end 190b are connected to terminals disposed at the fixed lens barrel 110. It could also be said that the first end 190b is supported by the fixed lens barrel 110.

The second end 190a includes a plurality of terminals 192. The terminals 192 of the second end 190a are connected to a plurality of terminals disposed at the second lens frame 130b.

That is, it could also be said that the second end 190a is supported by the second lens frame 130b.

The first intermediate portion 193 is disposed between the first end 190b and the bent portion 195. The first intermediate portion 193 has a first relay portion 193a, a mounting portion 275, and a second relay portion 193b. The mounting portion 275 functions as a relay end disposed between the first end 190b and the second end 190a and is supported by the rectilinear frame 170. The first relay portion 193a is a band-shaped portion extending straight ahead and is disposed between the first end 190b and a curved part 270. The second relay portion 193b is a band-shaped portion extending straight ahead, and is disposed between the curved part 270 and the bent portion 195.

The mounting portion 275 has the curved part 270 and a reinforcing member 280. The curved part 270 is a portion that is curved in a U shape, and links the first relay portion 193a and the second relay portion 193b. The reinforcing member 280 is fixed to the curved part 270. The curved part 270 is inserted along with the reinforcing member 280 into a slit (not shown) formed in the rectilinear frame 170. A plurality of holes 281 (see FIG. 6) are formed in the reinforcing member 280. For example, a plurality of protrusions (not shown) formed on the rectilinear frame 170 are fitted into the holes 281. This makes it less likely that the reinforcing member 280 will fall out of the rectilinear frame 170 in the optical axis direction.

The length from the first end 190b to the second end 190a (more precisely, the length of the first relay portion 193a and the second relay portion 193b) is set to be long enough not to affect the movement of the second lens frame 130b and the rectilinear frame 170. As shown in FIG. 3, when the second lens frame 130b is the farthest away from the fixed lens barrel 110, the flexible wire 190 is lightly taut. As shown in FIG. 4, when the second lens frame 130b has moved closer to the fixed lens barrel 110, the flexible wire 190 is slack. In the retracted state shown in FIG. 4, the first relay portion 193a goes back and forth between the second moving lens barrel 120b and the master flange 240 and between the third moving lens barrel 120c and the master flange 240. Further, the second relay portion 193b goes back and forth between the first lens frame 130a and the master flange 240.

Figure 7:
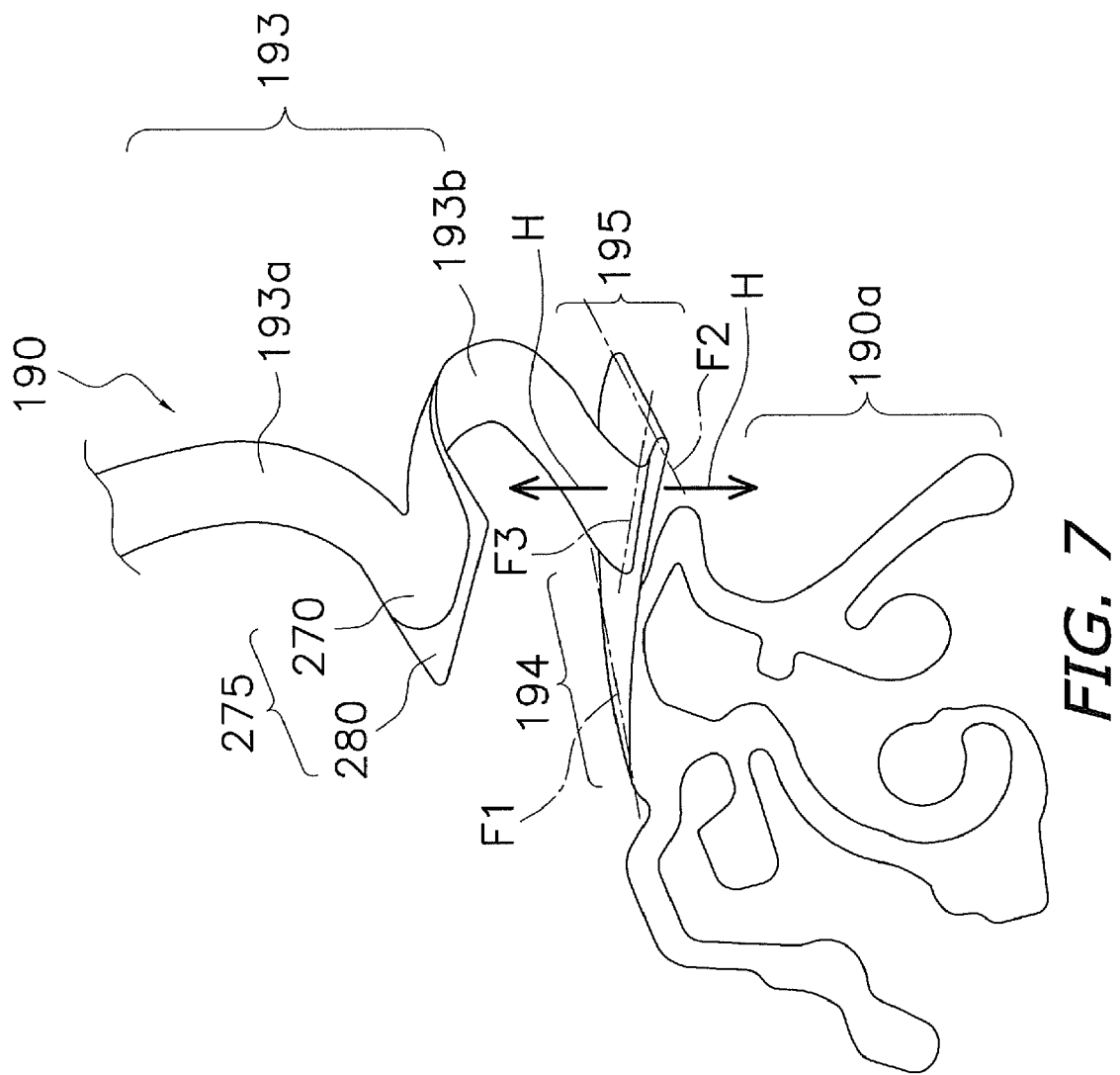
FIG. 7 is an oblique view of flexible wire.
Figure 8:
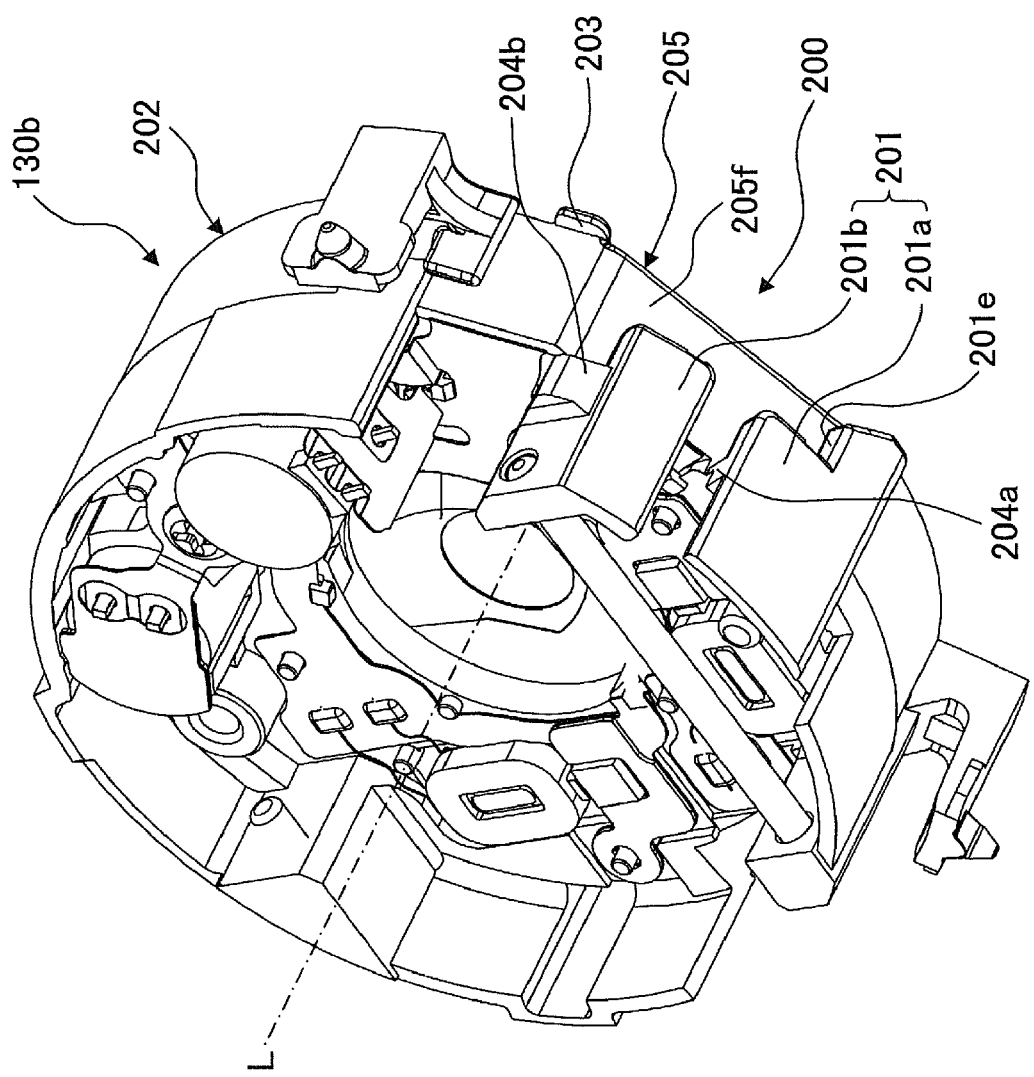
FIG. 8 is an oblique view of the second lens frame.
Figure 9:
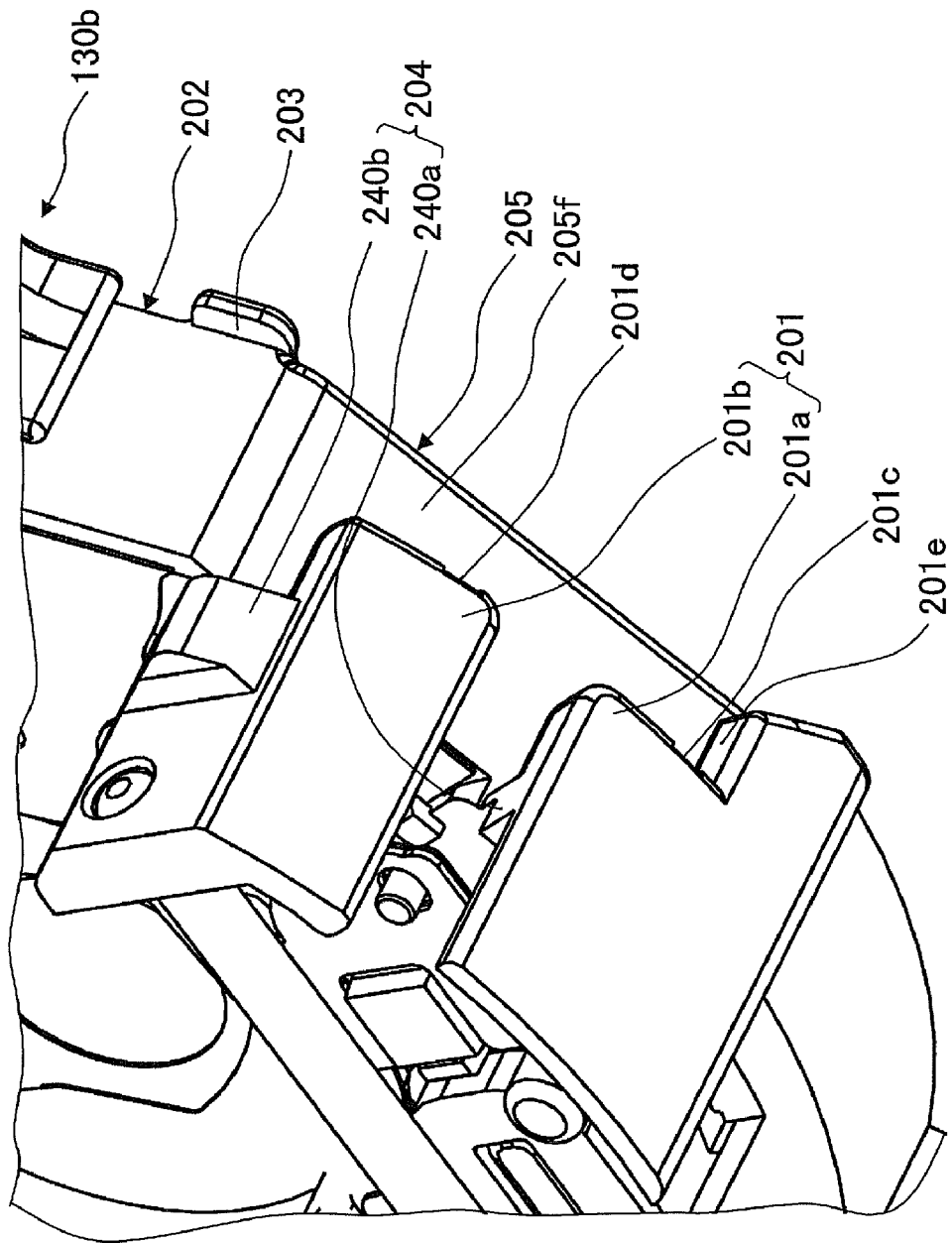
FIG. 9 is a detail enlargement of FIG. 8.
Figure 10:
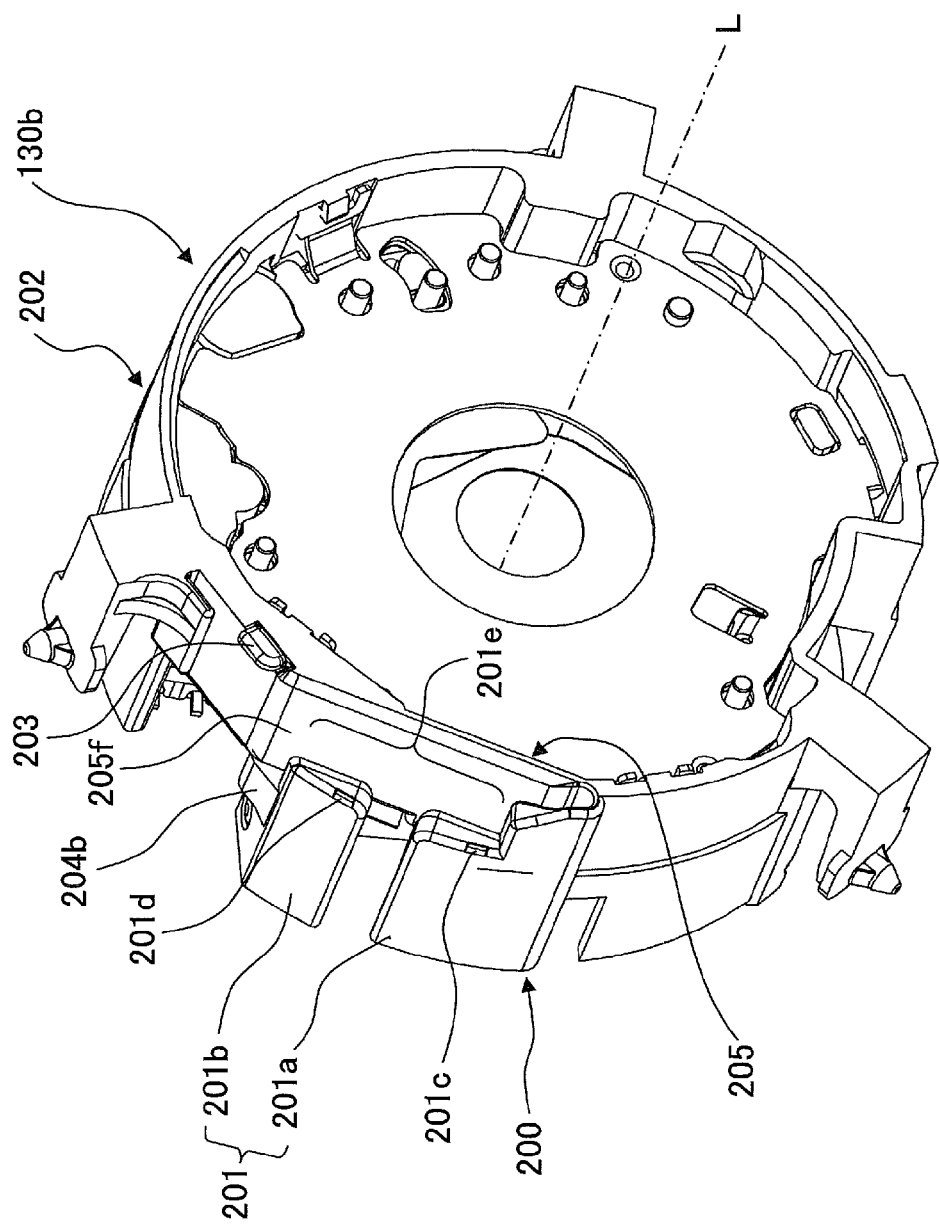
FIG. 10 is an oblique view of the second lens frame.
Figure 11:
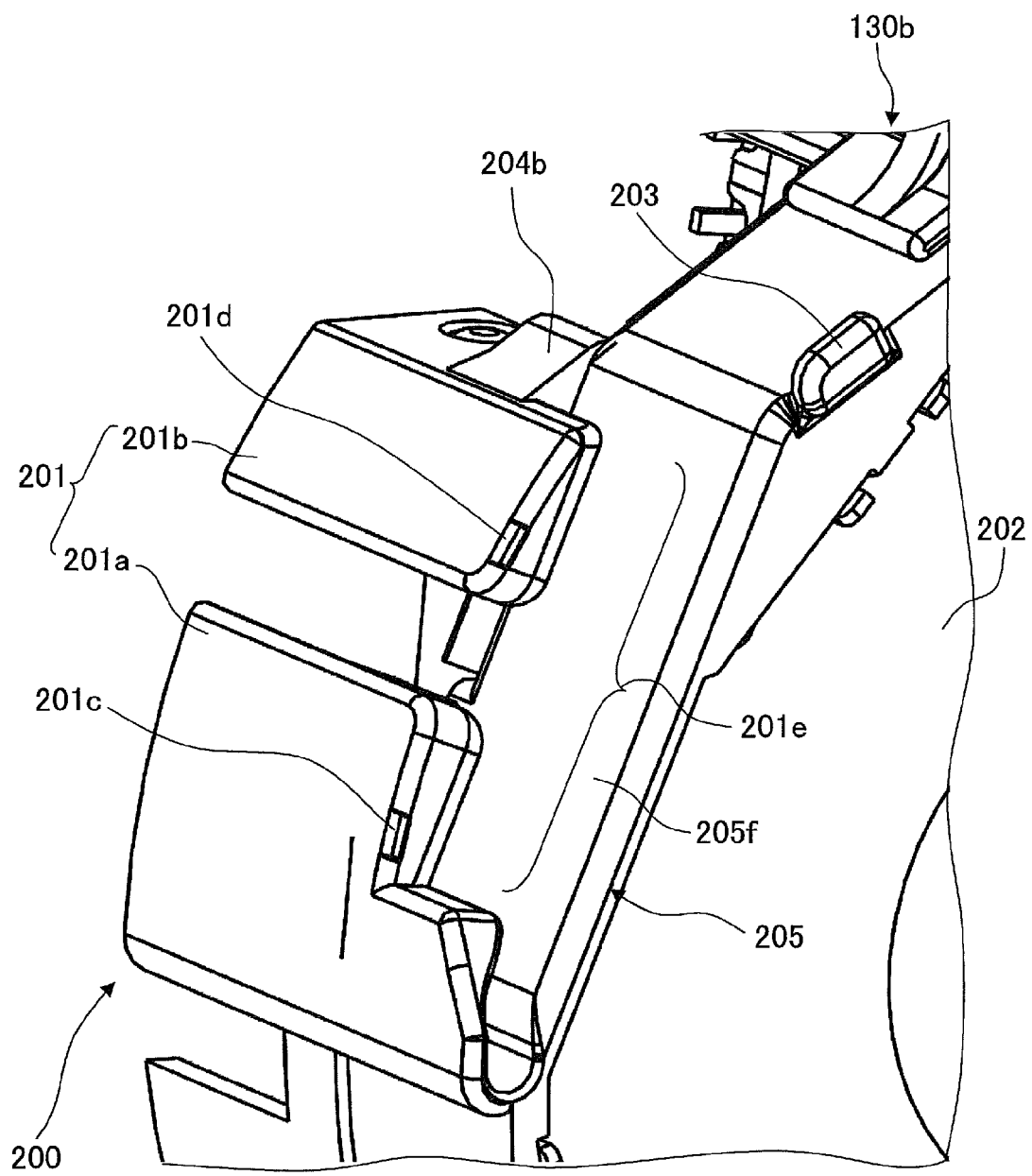
FIG. 11 is a detail enlargement of FIG. 10.
Figure 12:
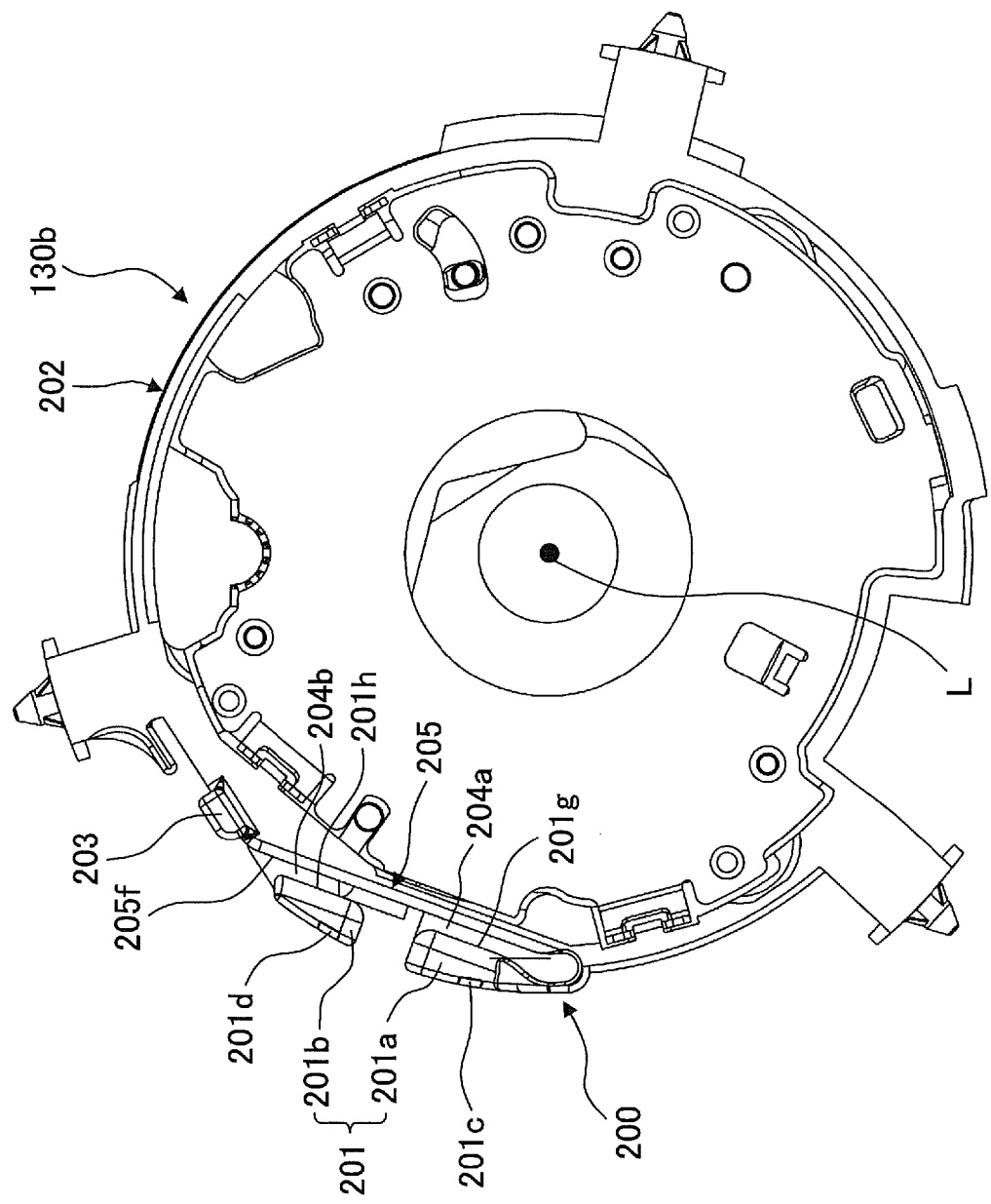
FIG. 12 is a plan view of the second lens frame.
Figure 13:
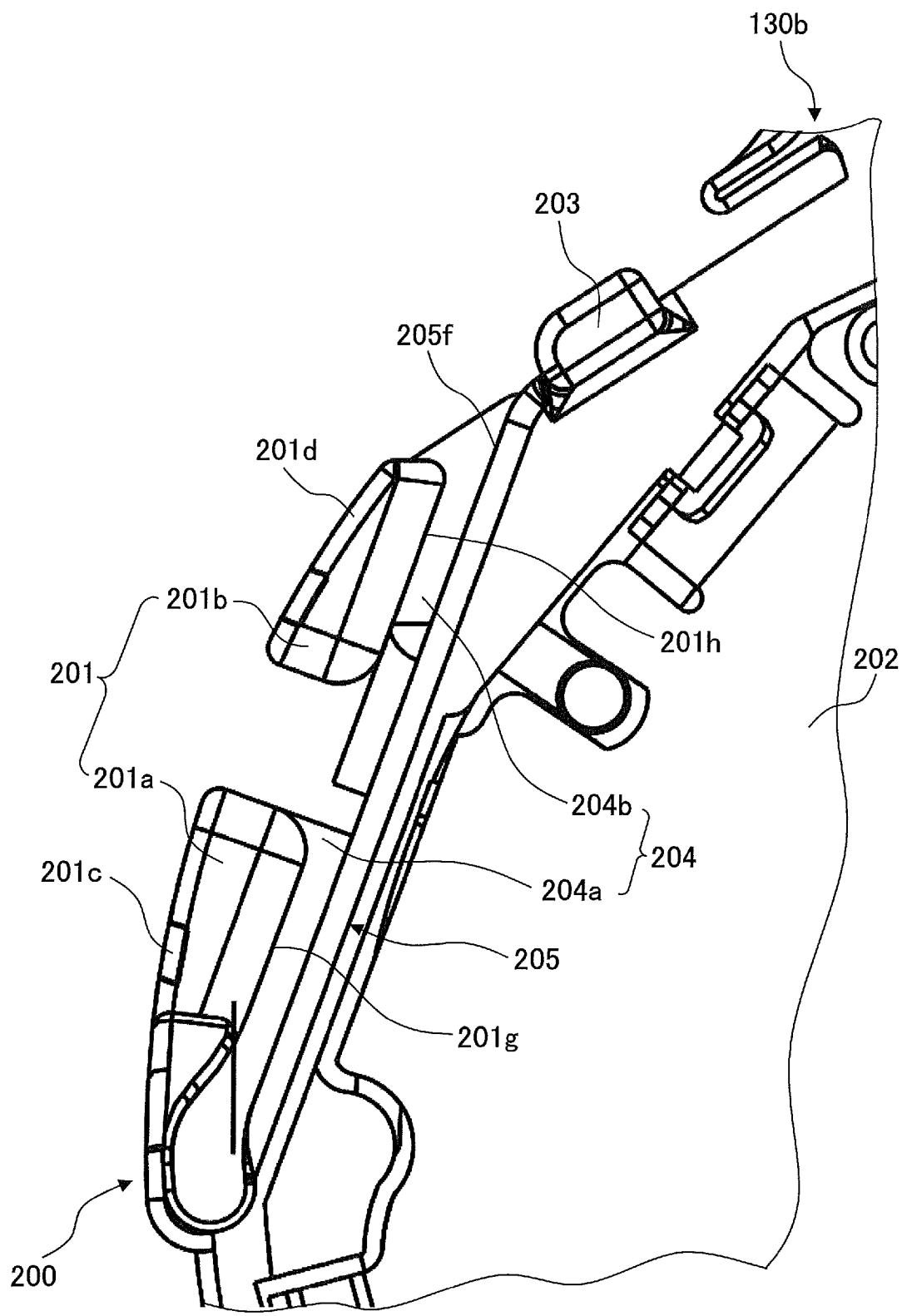
FIG. 13 is a detail enlargement of FIG. 12.
Figure 14:
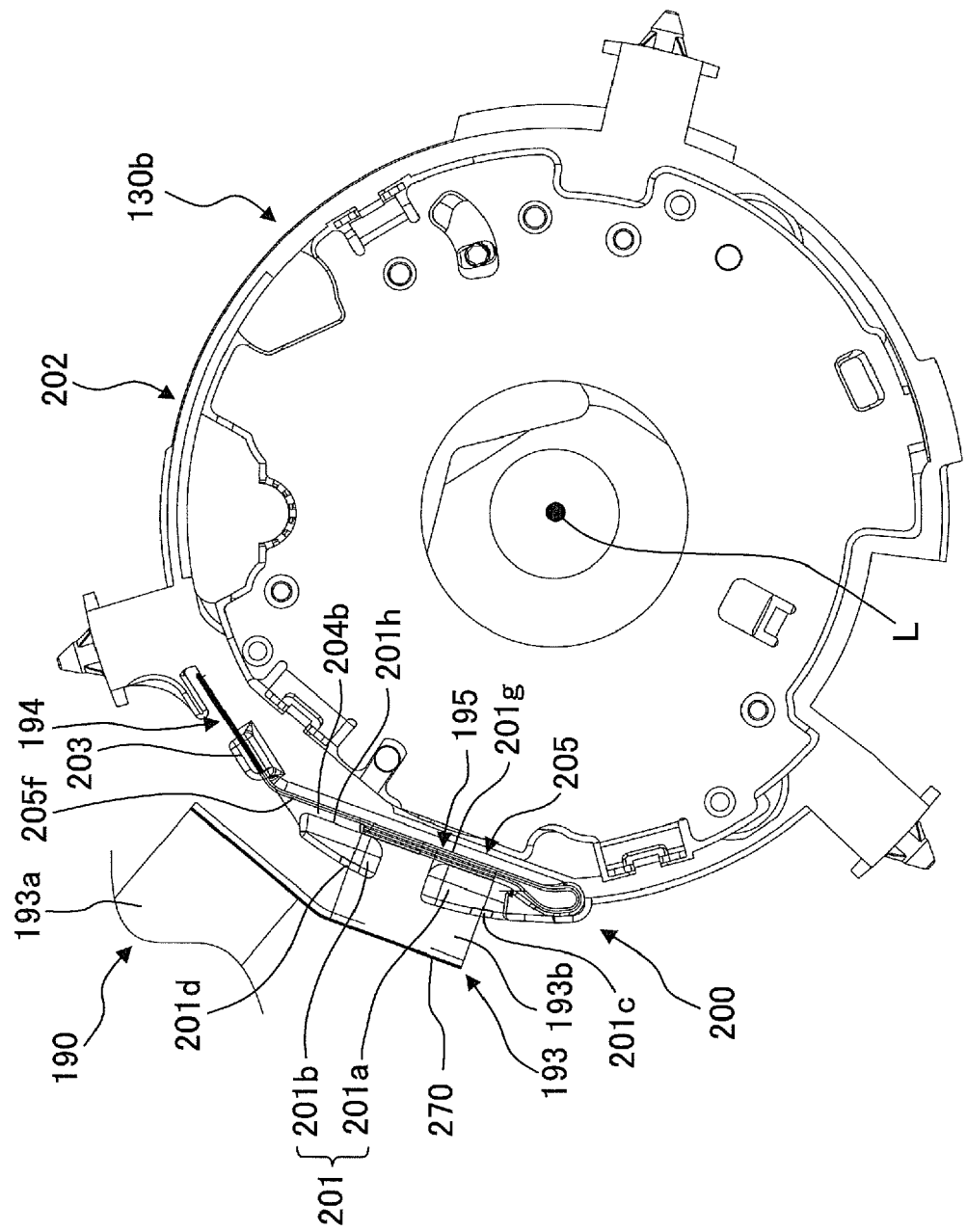
FIG. 14 is a plan view of the flexible wire and the second lens frame.

The bent portion 195 is formed such that the band-shaped portion is bent over on itself a number of times, and has plurality of part overlapping each other. For example, as shown in FIGS. 6 and 7, the flexible wire 190 is bent at a first bending line F1, a second bending line F2, and a third bending line F3. In this embodiment, the bent portion 195 is formed by bending three band-shaped portions over each other. As will be described below, the bent portion 195 is supported by the second lens frame 130b.

Detailed Configuration of Second Lens Frame

The second lens frame 130b uses the resiliency of the bent portion 195 to support the bent portion 195. The term "resilience" here is the force with which the bent portion 195 tries to unfold and return to its original state and is mainly a force generated by the flexible wire 190. For example, when the flexible wire 190 is in a free state, a force H shown in FIG. 7 is generated in the bent portion 195 by the elastic force of the flexible wire 190.

As shown in FIGS. 8 to 15, the second lens frame 130b has a main body 202, a storage wall 201 (an example of a second support portion), a limiting wall 204 (an example of a first limiter), and a limiting protrusion 203 (an example of a second limiter). The second lens frame 130b is integrally molded from a resin or the like.

The main body 202 constitutes the main part of the second lens frame 130b, and supports the shutter unit 180 and the shake correcting mechanism 185. Most of the outer peripheral part of the main body 202 is formed substantially in an arc shape around the optical axis L, but part of it is formed in a flat shape. More specifically, the main body 202 has a base portion 205 (an example of a first support portion) formed in a flat shape.

The base portion 205 is provided to support the bent portion 195 of the flexible wire 190, and is disposed along the circumferential direction of the second lens frame 130b. The base portion 205 extends in the optical axis direction from the main body 202. It could also be said that the base portion 205 extends in the optical axis direction from the limiting wall 204. The base portion 205 has a base face 205f (an example of a first support face) disposed parallel to the optical axis direction. The base face 205f is a plane that is parallel to the optical axis direction.

The storage wall 201 is provided to support the bent portion 195 of the flexible wire 190, and is formed to cover part of the base portion 205. More specifically, the storage wall 201 has a first storage wall 201a (an example of a first support portion) and a second storage wall 201b (an example of a first support portion). The first storage wall 201a and the second storage wall 201b are disposed facing the base portion 205 in the radial direction of the second lens frame 130b (an example of a second direction perpendicular to the optical axis direction). The first storage wall 201a and the second storage wall 201b are disposed aligned with each other and with a gap in between in the circumferential direction of the second lens frame 130b.

The first storage wall 201a extends in the optical axis direction from a first limiting wall 204a (discussed below) of the limiting wall 204, and the second storage wall 201b extends in the optical axis direction from a second limiting wall 204b of the limiting wall 204. The bent portion 195 is inserted between the base portion 205 and the storage wall 201. More specifically, the bent portion 195 is inserted between the base portion 205 and the first storage wall 201a, and is also inserted between the base portion 205 and the second storage wall 201b.

More precisely, as shown in FIGS. 12 to 15, the first storage wall 201a has a first plane 201g (an example of a second support face) disposed parallel to the optical axis direction, and the second storage wall 201b has a second plane 201h (an example of a second support face) disposed parallel to the optical axis direction. The first plane 201g and the second plane 201h are disposed facing the base face 205f. The first plane 201g and the second plane 201h are planes parallel to the optical axis direction, and are disposed substantially parallel to the base face 205f. The bent portion 195 is inserted between the base face 205f and the first plane 201g, and is also inserted between the base face 205f and the second plane 201h.

Figure 15:
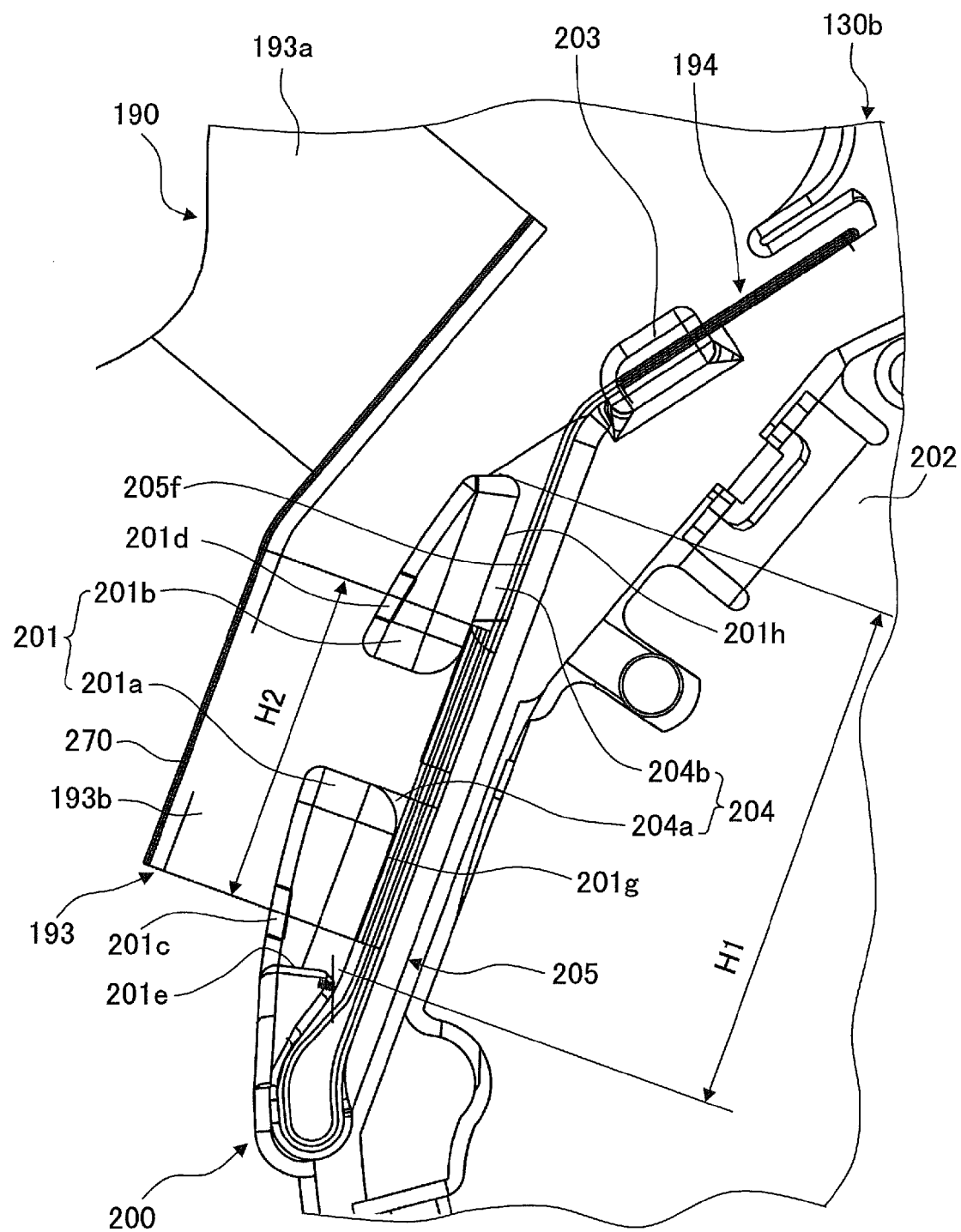
FIG. 15 is a detail enlargement of FIG. 14.

The storage wall 201 has a cut-out 201e formed at the end in the optical axis direction. As shown in FIG. 15, the cut-out 201e is disposed at a position corresponding to the first intermediate portion 193. The width H1 of the cut-out 201e is greater than the width H2 of the first intermediate portion 193. In this embodiment, the first storage wall 201a and the second storage wall 201b are completely separate portions, but define the cut-out 201e when the storage wall 201 is considered to be an integral member. Since the cut-out 201e is formed in the storage wall 201, the storage wall 201 has a portion that is shorter in the optical axis direction than the base portion 205. In this embodiment, the second storage wall 201b and part of the first storage wall 201a are shorter in the optical axis direction than the base portion 205.

Furthermore, the storage wall 201 has a first position display part 201c (an example of a position display part) and a second position display part 201d (an example of a position display part) that indicate a reference position in the width direction of the first intermediate portion 193. The first position display part 201c is formed at the first storage wall 201a, and the second position display part 201d is formed at the second storage wall 201b. In this embodiment, the first position display part 201c and the second position display part 201d are recesses that are recessed in the optical axis direction. During assembly, the bent portion 195 is inserted between the base portion 205 and the storage wall 201 so that the first intermediate portion 193 is disposed between the first position display part 201c and the second position display part 201d. Thus providing an indicator of the position of the first intermediate portion 193 makes it easier to dispose the first intermediate portion 193 at the specified position of the second lens frame 130b, and prevents damage to the first intermediate portion 193 by twisting or the like.

The first position display part 201c and the second position display part 201d may also have a different shape, such as that of a protrusion or a slit. Also, as long as the position of the first intermediate portion 193 can be identified, only either the first position display part 201c or the second position display part 201d may be used.

The limiting wall 204 is disposed to be contactable with the bent portion 195 in the optical axis direction. The limiting wall 204 has the first limiting wall 204a (an example of a first limiter) and the second limiting wall 204b (an example of a second limiter). The first limiting wall 204a links the base portion 205 and the first storage wall 201a, and the second limiting wall 204b links the base portion 205 and the second storage wall 201b. The first limiting wall 204a protrudes outward in the radial direction from the base portion 205, and the first storage wall 201a extends in the optical axis direction from the first limiting wall 204a. Similarly, the second limiting wall 204b protrudes outward in the radial direction from the base portion 205, and the second storage wall 201b extends in the optical axis direction from the second limiting wall 204b.

The limiting protrusion 203 is disposed to be contactable with the second intermediate portion 194 in the optical axis direction. More specifically, the limiting protrusion 203 is a protrusion disposed adjacent to a storage component 200 and protrudes outward in the radial direction from the main body 202. The position of the limiting protrusion 203 in the optical axis direction differs from the positions of the first limiting wall 204a and the second limiting wall 204b in the optical axis direction. More specifically, whereas the first limiting wall 204a and the second limiting wall 204b are disposed to the front of the main body 202 (on the subject side), the limiting protrusion 203 is disposed to the rear of the main body 202 (on the opposite side from the subject). The distance between the limiting wall 204 and the limiting protrusion 203 in the optical axis direction is set to be about the same as the width of the second intermediate portion 194. Also, the position of the limiting protrusion 203 in the circumferential direction differs from the positions of the first limiting wall 204a and the second limiting wall 204b in the circumferential direction. More specifically, when viewed in the optical axis direction, the limiting protrusion 203 is disposed to the side of the limiting wall 204. The second intermediate portion 194 and the bent portion 195 of the flexible wire 190 are supported in the optical axis direction between the limiting wall 204 and the limiting protrusion 203.

The bent portion 195 is inserted in the storage component 200 in the optical axis direction, and the second intermediate portion 194 is hooked onto the limiting protrusion 203. More precisely, the bent portion 195 is inserted from the rear into the storage component 200. With this constitution, it is easier to ensure a wide range of movement for the second lens frame 130b and the rectilinear frame 170. Similarly, the curved part 270 is inserted from the rear into the slit of the rectilinear frame 170. With this constitution, it is easier to ensure a wide range of movement for the second lens frame 130b and the rectilinear frame 170.

Operation of Lens Barrel

The operation of the lens barrel 100 will be described through reference to FIGS. 2 to 4. As shown in FIG. 2, at the wide angle end the first to third moving lens barrels 120a to 120c are deployed from the fixed lens barrel 110. As shown in FIG. 3, at the telephoto end the first to third moving lens barrels 120a to 120c are deployed the farthest out. At this point, the rectilinear frame 170 is farthest away from the fixed lens barrel 110, and the second lens frame 130b is also farthest away from the fixed lens barrel 110. Therefore, the first relay portion 193a and the second relay portion 193b of the flexible wire 190 are in their tautest state.

Meanwhile, as shown in FIG. 4, when the lens barrel 100 is not being used for imaging (that is, when it is retracted), the first to third moving lens barrels 120a to 120c are stowed in the fixed lens barrel 110. Here, the rectilinear frame 170 approaches the master flange 240 of the fixed lens barrel 110, and the second lens frame 130b approaches the master flange 240 of the fixed lens barrel 110. Accordingly, the first relay portion 193a and the second relay portion 193b of the flexible wire 190 are in a slackened state.

Features of Lens Barrel

The features of the lens barrel 100 described above will now be discussed.

(1) With the lens barrel 100, the second lens frame 130b uses the resiliency of the bent portion 195 to support the bent portion 195. More specifically, since the bent portion 195 is inserted between the base portion 205 and the storage wall 201, the resiliency of the bent portion 195 causes the bent portion 195 to be pressed against the base portion 205 and the storage wall 201. With this constitution, it is less likely that the mounting state of the flexible wire 190 with respect to the second lens frame 130b will change as a result of environmental changes or elapsed time. Also, in some cases the bent portion 195 can be supported by the second lens frame 130b without the use of tape or another such fixing member, so the mounting state of the flexible wire 190 with respect to the second lens frame 130b will not be affected by changes over time.

Thus, with the lens barrel 100, the flexible wire 190 can be easily attached and removed, and stability of the mounting state can be improved.

(2) The storage wall 201 is disposed facing the base portion 205 in the radial direction (an example of the second direction) of the second lens frame 130b. The storage wall 201 is disposed farther to the outer peripheral side than the base portion 205 and forms the outer peripheral part of the second lens frame 130b. Therefore, in a state in which the bent portion 195 is inserted between the storage wall 201 and the base portion 205, the bent portion 195 is protected by the storage wall 201. With this constitution, even if another member should move near the outer peripheral side of the second lens frame 130b, the storage wall 201 will minimize direct contact between the bent portion 195 and the other member, and thus minimize damage to the flexible wire 190.

(3) Since the bent portion 195 is disposed to be contactable with the limiting wall 204 in the optical axis direction, the position of the bent portion 195 in the optical axis direction with respect to the second lens frame 130b is stable. Consequently, the position of the flexible wire 190 with respect to the second lens frame 130b is stable regardless of any movement of the second lens frame 130b.

Also, since the limiting wall 204 links the base portion 205 and the storage wall 201, the storage component 200 formed by the storage wall 201 and the limiting wall 204 is stronger, while the position of the bent portion 195 in the optical axis direction can be stabilized.

Furthermore, since the limiting protrusion 203 is disposed to be contactable with the second intermediate portion 194 in the optical axis direction, the position of the second intermediate portion 194 in the optical axis direction is stable. Consequently, the position of the flexible wire 190 with respect to the second lens frame 130b is stable regardless of any movement of the second lens frame 130b.

(4) Since the storage wall 201 has the cut-out 201e, a wide range of movement of the first intermediate portion 193 around the bent portion 195 can be ensured. Consequently, when the second lens frame 130b moves in the optical axis direction, the pulling force exerted on the first intermediate portion 193 pulled out from the bent portion 195 can be lessened.

(5) Since the storage wall 201 has the first position display part 201c and the second position display part 201d, when the bent portion 195 is inserted between the base portion 205 and the storage wall 201, the position of the bent portion 195 or the first intermediate portion 193 can be determined on the basis of the first position display part 201c or the second position display part 201d. This makes assembly of the lens barrel 100 easier.

(6) Since the bent portion 195 is inserted between the base face 205f and a second support face 201f, a larger contact surface area can be ensured between the bent portion 195 and the second lens frame 130b, and the orientation and position of the bent portion 195 with respect to the second lens frame 130b tend to be more stable.

(7) Since the second end 190a of the flexible wire 190 is supported by the second lens frame 130b, the portion from the second end 190a to the bent portion 195 (that is, the second intermediate portion 194) is supported by the second lens frame 130b. Therefore, the orientation and position of the bent portion 195 with respect to the second lens frame 130b tend to be more stable.

Other Embodiments

Embodiments of the present invention are not limited to what was given above, and various improvements and changes are possible without departing from the gist of the invention. Also, the above embodiment is fundamentally a preferred example, and is not intended to limit the scope of the present invention, or its applications, or the range of its applications.

(1) The configuration of the flexible wire 190 is not limited to that in the above embodiment. For example, the first end 190b may include at least one terminal, and the second end may include at least one terminal.

Also, in the above embodiment the bent portion 195 was formed by three overlapping band-shaped portions of the flexible wire 190, but the bent portion 195 may have two or more overlapping portions.

The flexible wire 190 has the curved part 270, but the curved part 270 may be omitted. In this case, the first end 190b and the bent portion 195 are linked by the first relay portion 193a.

(2) The bent portion 195 is inserted into the storage component 200 from the optical axis direction (an example of the first direction), but the insertion direction of the bent portion 195 is not limited to the optical axis direction.

(3) The storage component 200 is provided to the second lens frame 130b, but the storage component 200 may instead be provided to the first moving lens barrel 120a, the second moving lens barrel 120b, or the third moving lens barrel 120c. Also, the second end 190a and the bent portion 195 are supported by the same support frame, but may instead be supported by individual support frames.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of an imaging device equipped with the lens barrel. Accordingly, these terms, as utilized to describe the present invention should be interpreted relative to an imaging device equipped with the lens barrel.

The term "configured" as used herein to describe a component, section, or part of a device implies the existence of other unclaimed or unmentioned components, sections, members or parts of the device to carry out a desired function.

The terms of degree such as "substantially", "about" and "approximately" as used herein mean a reasonable amount of deviation of the modified term such that the end result is not significantly changed.

What is claimed is:

1. A lens barrel comprising:
   a flexible wire including a first end with at least one terminal, a second end with at least one terminal and a bent portion disposed between the first and second ends, the bent portion including a first bend part and a plurality of parts overlapping each other;
   a first supporting frame configured to support the first end; and
   a second supporting frame movably disposed in a first direction with respect to the first supporting frame and configured to supports the bent portion,
   the first bent part being bent in a direction transverse to the first direction.

2. The lens barrel according to claim 1, wherein
   the second supporting frame includes a first support portion and a second support portion facing the first support portion,
   the bent portion is disposed between the first support portion and the second support portion, and
   the bent portion is pressed against the first and second support portions by way of the resiliency of the bent portion caused by bending the bent portion.

3. The lens barrel according to claim 2, wherein
   the second support portion is disposed in a second direction perpendicular to the first direction and facing the first support portion.

4. The lens barrel according to claim 2, wherein
   the second support portion is disposed on the outer peripheral side of the first support portion and forms the outer peripheral part of the second supporting frame.

5. The lens barrel according to claim 2, wherein
   the second supporting frame has a first limiter arranged to come in contact with the bent portion in the first direction.

6. The lens barrel according to claim 5, wherein
   the first limiter connects the first support portion to the second support portion.

7. The lens barrel according to claim 6, wherein
   the first support portion and the second support portion extend from the first limiter in the first direction.

8. The lens barrel according to claim 2, wherein
   the flexible wire further includes a second intermediate portion disposed between the bent portion and the second end, and the second supporting frame further includes a second limiter arranged to come in contact with the second intermediate portion in the first direction.

9. The lens barrel according to claim 2, wherein
   an end of the second support portion has a cut-out in the first direction.

10. The lens barrel according to claim 9, wherein
    the flexible wire further includes a band-shaped first intermediate portion disposed between the bent portion and the first end, and the position of the cut-out corresponds to the first intermediate portion.

11. The lens barrel according to claim 10, wherein
    the cut-out is wider than the first intermediate portion.

12. The lens barrel according to claim 10, wherein
    the second support portion has a position display part that indicates a reference position for the first intermediate portion along the width direction of the first intermediate portion.

13. The lens barrel according to claim 2, wherein
    the length of the second support portion is smaller in the first direction than the first support portion.

14. The lens barrel according to claim 2, wherein
    the first support portion has a first support face parallel to the first direction and the second support portion has a second support face parallel to the first direction, and the bent portion is disposed between the first support face and the second support face.

15. The lens barrel according to claim 14, wherein
    the first support face is a plane parallel to the first direction, and the second support face is a plane parallel to the first direction.

16. The lens barrel according to claim 1, wherein
    the second supporting frame supports the second end of the flexible wire.

17. An imaging device comprising the lens barrel according to claim 1.

18. The lens barrel according to claim 1, wherein
    the flexible wire further includes a plurality of printed wires.

19. The lens barrel according to claim 1, wherein
    the bent portion further includes a second bent part that is bent in the first direction.

* * * * *